April 13, 1965       R. S. WEBB              3,178,551
         CURRENT SENSITIVE PER-PULSE CUT-OFF CIRCUIT
Filed Oct. 24, 1961                        3 Sheets-Sheet 3

INVENTOR.
Robert S. Webb
BY
M K Murphy
ATTORNEY.

United States Patent Office 3,178,551
Patented Apr. 13, 1965

3,178,551
CURRENT SENSITIVE PER-PULSE CUT-OFF CIRCUIT
Robert S. Webb, Bloomfield Hills, Mich., assignor to Elox Corporation of Michigan, Troy, Mich., a corporation of Michigan
Filed Oct. 24, 1961, Ser. No. 147,336
25 Claims. (Cl. 219—69)

This invention relates to improved apparatus for electrical discharge machining particularly to machining power circuitry and an improved form of per-pulse cut-off circuit and is a continuation-in-part of my copending application Serial No. 26,526, filed May 3, 1960, issued on January 23, 1962 as U.S. Patent No. 3,018,411.

Electrical discharge machining, sometimes referred to in the art as EDM, spark machining, or arc machining is carried on by passing a series of discrete, localized, extremely high-current-density discharges across a gap between a conductive tool electrode and workpiece at sonic or ultrasonic frequencies in the presence of a dielectric fluid for eroding the workpiece.

In electrical discharge machining the conductive tool is usually maintained in proximate position with the workpiece by an automatic servo feed and is advanced toward or into the workpiece as stock is removed therefrom.

A fluid coolant, usually a liquid, is circulated through the working gap to flush the eroded particles from the gap and is sometimes furnished under pressure by a pump through a pattern of holes in the electrode. The defining characteristic of electrical discharge machining is that the coolant is a dielectric such as kerosene, transformer oil or pure water and is broken down in minute, localized areas by the action of the machining power supply between the closest points of the tool and work.

In the above mentioned patent, per-pulse cut-off circuitry for machining power short circuit protection is described in which each machining pulse is electronically inspected for the proper magnitude of gap voltage, and any discharge having a gap voltage below a preset minimum is electronically interrupted instantaneously. The above application is directed particularly to per-pulse circuitry operably responsive to gap voltage conditions.

The principal object of this invention is more properly described as a per-pulse current cut-off circuit in which any gap discharge having a machining current above a predetermined maximum is electronically interrupted instantaneously, and subsequent pulses of proper magnitude are permitted to pass. I have found that this circuitry is superior in performance and less complex than the corresponding gap voltage per-pulse circuit for two important reasons: (1) phasing of a current sensitive per-pulse circuit and (2) simplified sensing.

A voltage sensitive per-pulse circuit responds to a voltage below a preset minimum to interrupt machining power during an individual pulse, but this necessitates that the cut-off circuitry be keyed in phase with the machining power pulse as described in the above application. In other words, a rising gap voltage fails to rise to a sufficiently high level, or an existing gap discharge falls below the minimum level acceptable and is interrupted. Thus two essential features are required in a voltage sensitive circuit. They are: (1) a rise in gap voltage followed by (2) a fall in gap voltage, or a rising gap voltage failing to reach a predetermined minimum voltage.

A machining current responsive per-pulse cut-off circuit on the other hand responds simply to an increasing machining current, specifically to a pulse having machining current above a preset maximum. In a voltage sensitive circuit the gap voltage between discharges is necessarily low or zero, and is necessarily maximum on open circuit and it is necessary to distinguish between these two conditions, a short circuit pulse being interrupted and an open circuit pulse being permitted to pass. A current sensitive per-pulse circuit on the other hand, responding only to machining current, measures no current on either open circuit or the period between pulses and therefore does not require complex discriminating circuitry to determine the difference between the two. A current sensitive circuit responds solely to an increase in machining current above a predetermined maximum to instantaneously interrupt a faulty pulse.

In a pulse type machining power circuit the essential components are: (1) a source of D.C. voltage; (2) an electronic switch for alternately switching the D.C. voltage ON and OFF (or pulsing the gap at selected duration and frequency); (3) the machining gap consisting of the electrode and work, and (4) an impedance, usually resistance connected in the external circuit or inherent in the electronic switch. In any given machining power circuit the supply voltage is constant and therefore a decrease in gap voltage automatically reflects an increase in switch or impedance voltage. In this sense, a current sensitive circuit of this type may be considered to respond either to machining current or during conduction to the difference between gap voltage and supply voltage which is necessarily an indirect measurement of gap voltage. The important consideration is that the complex keying required for a gap voltage circuit is unnecessary in a gap current circuit.

The second important advantage of a current sensitive circuit is that gap voltage must be measured at the gap, and for a voltage responsive circuit the series drops in unintentional impedances such as lead lengths and control resistance must be eliminated. Thus a gap voltage circuit must carry sensing leads directly to the machining gap external to the power supply, whereas a gap current sensitive circuit may measure current in any noninductive resistive element in series in the machining gap circuit. Thus sensing may be done inside the power supply and not be affected by its external environment. In either circuit, unintentional inductance causes a delay in the rise of machining current and at times in gap voltage itself. In the voltage sensitive circuit, it is essential to paralyze a per-pulse cut-off circuit during this initial portion of each discharge. In a current responsive circuit, inductance retards machining current and therefore maintains the machining current below the predetermined maximum inherently and automatically, and it is unnecessary to adjust leading edge delay for changing values of circuit inductance caused particularly by a change in the external work gap discharge loop area. The essential requirement for a current sensitive circuit is that the sensing element itself be noninductive and therefore be a true representation of machining current itself.

Accordingly, it is the principal object of this invention to provide a current sensitive per-pulse cut-off circuit responsive to the real value of gap discharge current or to the difference in voltage between supply voltage and the real gap voltage.

Another object of this invention is to provide a simplified circuit for sensing and measuring each individual gap discharge and instantaneously interrupting faulty discharges.

Other objects and advantages are disclosed in the following specification, which taken in conjunction with the accompanying drawings show preferred forms of practicing the invention.

In the drawings in which reference numerals have been used to designate like parts herein referred to:

Figure 1:
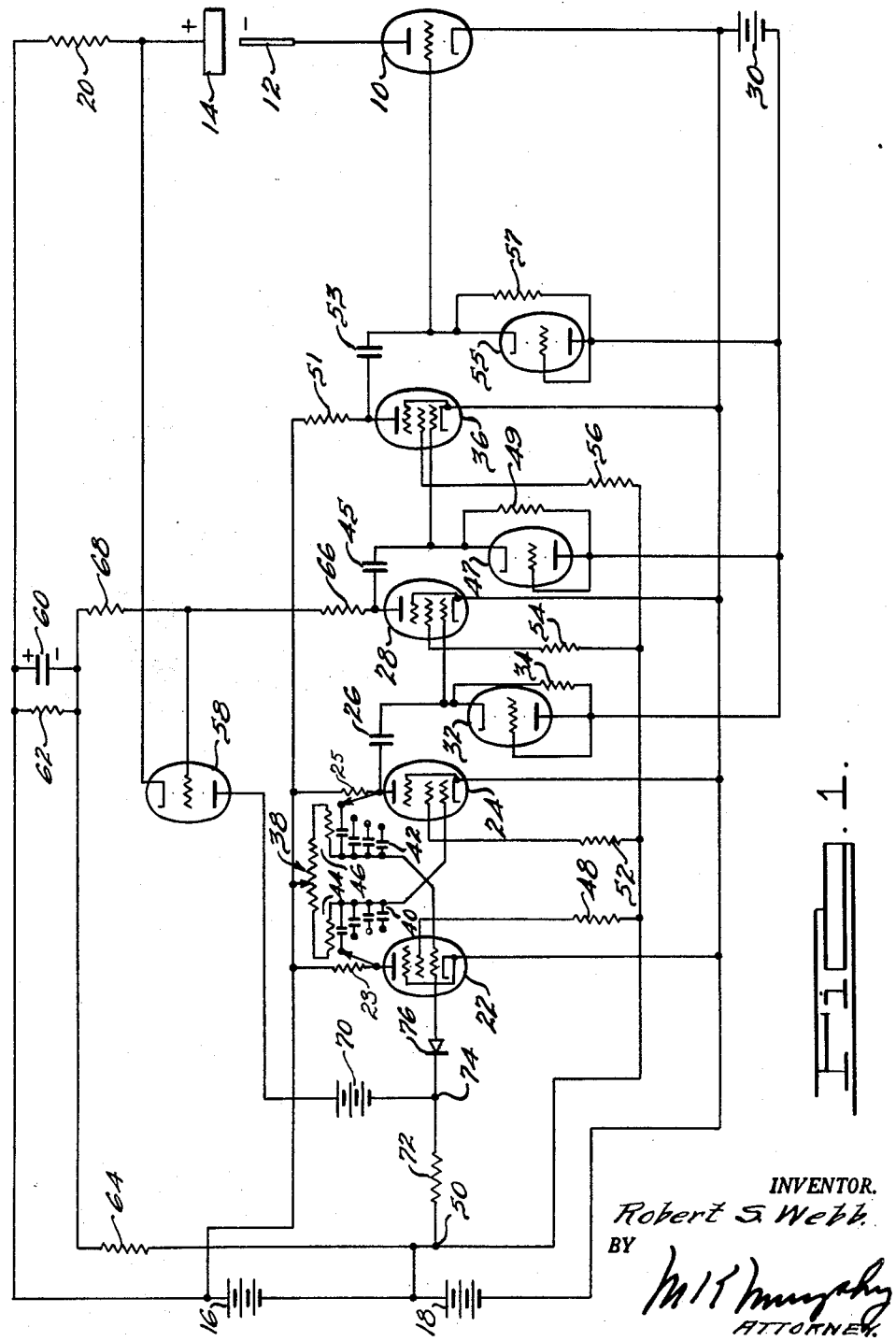
FIG. 1 shows a vacuum tube per-pulse cut-off current sensing circuit having the work gap and sensing circuit in the anode circuit of a vacuum tube bank.

Referring now to FIG. 1 which shows schematically a direct connected electron tube circuit in which a bank of tubes represented by triode 10 is connected directly to the electrode 12, the workpiece 14 is, in this instance, connected to the positive terminal of the gap power supplies 16 and 18 through resistor 20.

Tube bank 10 has its cathode connected to the negative terminal of voltage supply 18, thus completing the series EDM power circuit which provides erosive pulses across the machining gap controlled by excitation of the grids of the bank 10.

In precise machining by EDM, it is imperative that the power tube bank be pulsed ON and OFF at precise, sharply defined intervals. That is to say, the voltage waveform between grid and cathode of tube bank 10 must be rectangular in form, or as nearly so as can be achieved, such that bank 10 is turned ON and OFF sharply to provide optimum gap discharge. This rectangular pulse drive to the grid of tube bank 10 is generated by multivibrator tubes 22 and 24 operating according to well known principles of vacuum tube multivibrator design.

It may be seen by further analysis, that is this particular circuit the gap is ON or power is supplied to the machining gap when multivibrator tube 22 and tube bank 10 are ON and tube bank 10 and the gap are OFF when multivibrator tube 22 is OFF. Signal resistor 23 is connected in the anode circuit of tube 22 and resistor 25 is similarly connected in the anode circuit of tube 24. The rectangular pulsating output of multvibrator tube 24 developed across resistor 25 is connected through coupling capacitor 26 to the control grid of the buffer tube 28. The pulsating signal is clamped to bias 30 through diode connected triode 32 and drive or turn ON signal for tube 28 is developed across resistor 34. The rectangular voltage drive tends to be in excess of bias 30 and the excess portion is clipped by the grid of pentode 28 in a manner well known in the electronics industry as "re-squaring of the pulse" such that the output of tube 28 has an even sharper rise and fall voltage drive than the output of the multivibrator. In a similar manner, a tube bank represented by pentode 36 amplifies the output from pentode 28 and signal is again re-squared at the grid of this tube as well as the grid of the power tube bank itself. The output tube bank 10 consists of many vacuum tubes, perhaps hundreds or thousands, and in turn requires a bank in the order of 5 to 50 tubes in order to furnish drive power of sufficient amplitude. The grid circuit of tube bank 10 is therefore supplied with rectangular pulsating power in the order of 50 to 5000 watts or higher, depending on the size of tube bank 10. Rectangular pulsating power sufficient to drive the grid of power bank 10 is not commercially available in the electronics industry at present as a readily obtainable item.

A novel design feature of this particular circuit is in the multivibrator grid return and potentiometer 38. The special characteristic of this particular circuit is that by adjusting potentiometer 38, an increase in resistance in one grid circuit automatically decreases resistance in the other circuit, and an analysis of the respective ON and OFF time of each of the multivibrator tubes and the formulas for determining this, shows how to achieve a fixed output frequency. In other words, for equal capacitors 40 and 42, the time duration of one complete cycle of operation may be represented by: $KC(R_{44}+R_{46}+R_{38})$ where $C_{40}=C_{42}$. This expression for the discharge time constant is in units of microseconds when resistance is expressed in units of ohms and capacitance is expressed in units of microfarads. The letter K indicates a constant which is the constant for the circuit dependent upon the circuit parameters such as plate voltage gain and the like. This is novel and particularly important in an EDM circuit, since a constant frequency of operation may be maintained and the gap ON-time may be varied directly with the ON-time of multivibrator tube 22 as determined by capacitor 40, resistor 44, and the portion of the potentiometer 38 included in the grid return circuit of multivibrator tube 24. Thus, turning the potentiometer to the right and increasing the resistance in the grid circuit of tube 24 will cause an increase in the ON-time of tube 22 with consequent increase in ON-time across the gap. Since output tube bank 10 during ON-time may be approximated by a resistance, the quantity of machining current permitted in the gap may be controlled by the respective ON-time of multivibrator tube 22 and tube bank 10, thus giving precise control of the machining current supplied to the gap and permitting infinitesimal adjustments of that machining current while maintaining a fixed machining frequency.

The screen grid of pentode 22 is connected through limiting resistor 48 to screen voltage tap 50. Similarly, the screen grid of pentode 24 is connected through resistor 52; the screen grid of pentode 28 is connected through resistor 54 and the screen grid of pentode 36, through resistor 56, each to screen voltage tap 50.

The signal output of tube 28 is coupled through capacitor 45 to clamping diode connected triode 47. Positive drive signal for tube 36 is developed across resistor 49 which returns the grid of tube 36 to bias 30 during the absence of drive. The signal output of tube 36 is developed across resistor 51 and coupled through capacitor 53 to clamping diode connected triode 55 in the grid circuit of tube 10. Clamp 55 is shunted by resistor 57 which is similar in function to resistors 34 and 49.

Operation of the current sensitive per-pulse cut-off tube 58 and its associated circuitry is as follows. As power tube bank 10 is pulsed ON, it is capable of supplying power to the machining gap. Prior to the machining pulse, multivibrator tube 22, buffer tube 28 and power tube bank 10 are all cut-off or nonconducting. Per-pulse cut-off tube 58 is rendered nonconductive by the D.C. bias stored across capacitor 60 developed by voltage dividing resistors 62 and 64. With cut-off tube 58 nonconductive, operation of the multivibrator is unimpaired and as multivibrator tube 22 turns ON, buffer tube 28 is rendered conductive. Included in the plate circuit of tube 28 is dividing resistor 66 and a keying resistor 68 connected in the grid circuit of cut-off tube 58. Assuming a condition of open circuit, the full open circuit voltage is generated across the working gap and therefore no voltage drop occurs across resistor 20.

The cathode of tube 58 is at that instant effectively connected to the positive terminal of supply 16 and the bias stored in capacitor 60 maintains tube 58 nonconductive. Signal is developed across resistor 68 in the grid lead of cut-off tube 58. This signal is of such polarity that it tends to bias tube 58 further nonconductive and in the absence of voltage across resistor 20 maintains tube 58 nonconductive. The presence of a portion of the conduction voltage at the cathode of tube 58 cancels this keying signal corresponding to a gap voltage above the minimum required or a gap current below the maximum limit, and the cut-off tube remains nonconductive and operation of the circuit is unimpaired and proceeds in accordance with the normal functions of multivibrator tubes 22 and 24.

If the working gap is shorted or is a low enough voltage such that the signal developed across resistor 20 is larger than the keying voltage across resistor 68, cut-off tube 58 becomes instantaneously conductive. Conduction of the cut-off tube causes electron flow from the negative terminal of floating D.C. supply voltage 70 through resistor 72 to screen voltage tap 50 of the main D.C. power supply. The voltage generated across resistor 72 is substantially in excess of that of screen voltage tap 50 thus causing terminal 74 to become negative with respect to the cathode of tube 22. Terminal 74 is rendered sufficiently negative to interrupt conduction of multivibrator tube 22 and trigger the OFF portion of the cycle. During the period of conduction, tube 22 was ON and in-phase with power tube bank 10. Thus, as cut-off tube 58 renders tube 22 nonconductive, the amplifier instantaneously renders power tube bank 10 nonconductive interrupting the condition of short circuit or low voltage gap conduction or excess current flow. This interruption lasts for the normal duration of OFF-time or dwell between pulses as determined by multivibrator grid circuit 42, 46, 38, of tube 22. In this manner, a flaw or short circuit in the working gap instantaneously interrupts the particular machining cycle. During normal operation of this circuit, the grid of multivibrator tube 22 is isolated from the cut-off circuitry by diode 76, said diode becoming conductive only during periods of operation of cut-off tube 58, at which time terminal 74 is more negative than either the cathode or grid of tube 22.

Figure 2:
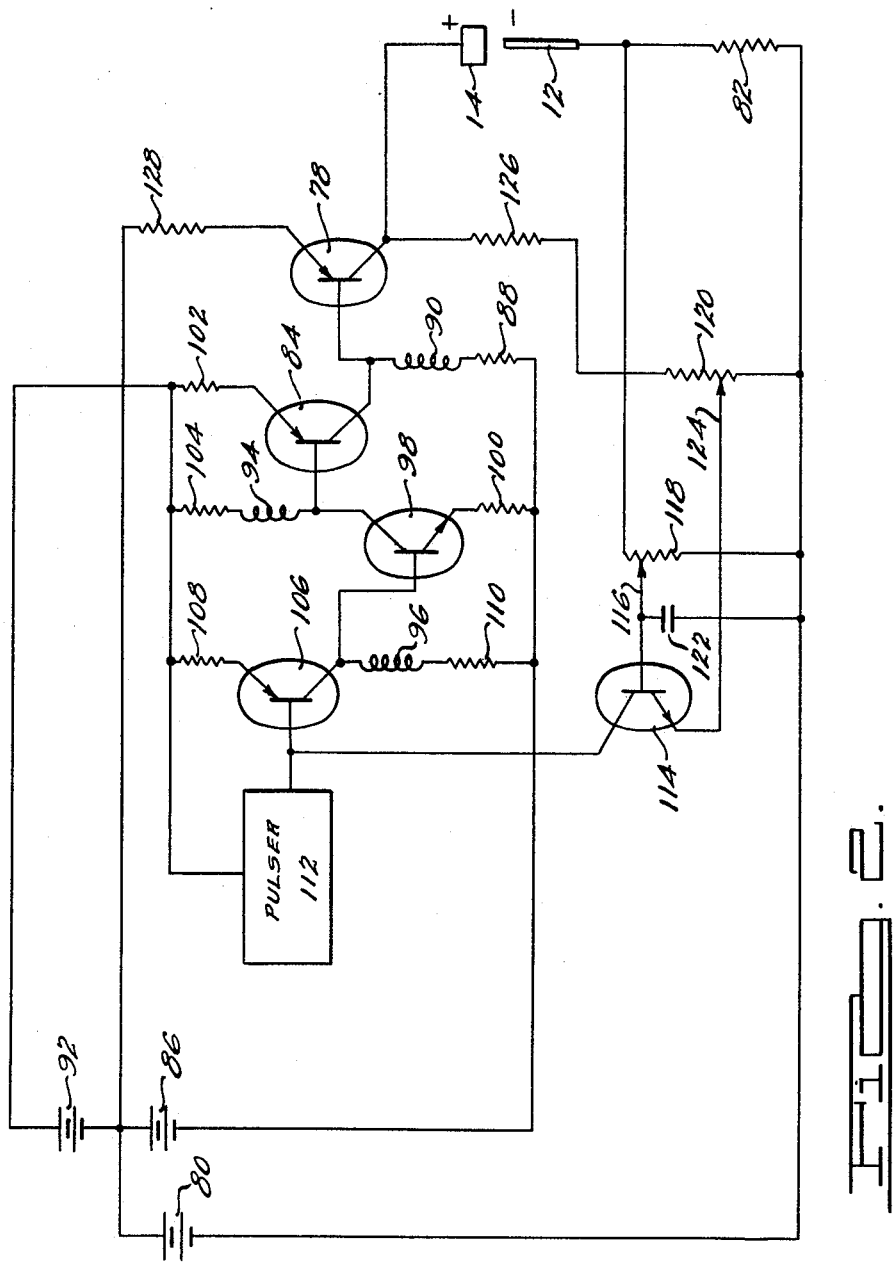
FIG. 2 is a transistorized EDM power circuit constructed according to the principles of this invention.

Consider next the operation of transistorized EDM circuitry as shown, for example, in FIG. 2. This is but one of many circuits embodying transistors for the control of the pulsating gap power as well as in the preamplifier. It is essential to realize that in this instance, rectangular pulses are also generated in a manner similar to the circuitry of FIG. 1. In the transistor circuitry of FIG. 2, the working gap consisting of electrode 12 and workpiece 14 is connected to the collector of transistor 78. The emitter of transistor 78 is connected to the positive terminal of the EDM D.C. power supply 80. The negative terminal of this power supply is connected to the electrode through current sensing resistor 82. Thus in a manner similar to the circuitry of FIG. 1, a transistor, a sensing resistor 82, and the working gap form a similar direct connected loop across D.C. power supply 80. The pulser amplifier for output transistor bank 78 is similar at least in principle to the circuitry of FIG. 1. Transistor 78 is in most instances, a bank of many transistors, perhaps hundreds of transistors, capable of generating the very high output machining currents required in EDM. PNP transistor 84 may represent a bank of transistors for the preamplifier in a manner analogous to that of the tube bank 36 in the circuitry of FIG. 1. In this circuitry, transistor driver bank 84 is nonconductive during conduction of transistor 78. PNP type transistor 78 is rendered conductive by D.C. power supply 86 through resistor 88 and choke 90. Conduction of transistor driver bank 84 connects the base of power bank 78 to positive D.C. bias 92 and thus cuts-off power bank 78 and shunts the current flow from resistor 88 and choke 90, such that the direction of electron flow for this condition is from drive voltage 86 through resistor 88, choke 90, collector-emitter of transistor 84, and back to the positive terminal of voltage 92.

Drive current during ON-time of transistor 78 is furnished from supply 86 through resistor 88, choke 90, the base-emitter circuit of transistor 78 and resistor 128 back to the positive terminal of voltage 86. Choke 90 as well as chokes 94 and 96 are included to provide sharp leading edge drive of the appropriate transistor network. During a period of OFF-time corresponding to conduction of transistor 84, increased electron flow is drawn through resistor 88 and choke 90 in accordance with the higher total voltage of bias 92 and drive voltage 86. As transistor 84 shuts OFF instantaneously, this increased electron flow is forced or accelerated through the base-emitter circuit of gap power transistor 78, thus providing sharp leading edge drive in an accelerated manner for the duration of the inductive effect of choke 90. As transistor 84 becomes instantaneously conductive, the increase in electron flow through choke 90 is momentarily retarded and provides for a sharp cut-off pulse to transistor 78, thus assuring vertical rise and fall and sharp switching action of each particular transistor stage.

An NPN transistor 98 drives transistor 84 drawing electron flow from drive supply 86 through bias resistor 100, emitter-collector of transistor 98, and base-emitter circuit of transistor 84. Electron flow is momentarily retarded through choke 94 thus providing a sharp surge to transistor 84 for turn ON through the base-emitter circuit of transistor 84 and bias resistor 102. During conduction, a shunt electron flow also occurs through choke 94 and resistor 104. As transistor 98 is switched OFF sharply, choke 94 sustains electron flow in the same direction and sharply cuts-off transistor 84 causing cut-off electron flow through resistor 104, resistor 102 and clearing the emitter-base circuit of transistor 84.

NPN transistor 98 is likewise rendered conductive by the first drive transistor shown in this amplifier as transistor 106. Electron flow for drive of transistor 98 occurs from the negative terminal of supply 86, through bias resistor 100, emitter-base circuit of transistor 98, collector-emitter of transistor 106, bias resistor 108, bias supply 92, to the positive terminal of drive voltage 86. After a short delay determined by inductance 96, a shunt electron flow is also drawn through resistor 110 and inductance 96 in parallel with network 100, 98. As transistor 106 shuts off sharply, choke 96 sustains a cut-off electron flow through the base-emitter circuit of transistor 98, resistor 100, resistor 110, thereby clearing and sharply cutting off transistor 98.

The pulser drive shown in this instance as pulser 112 may be a tube type of pulser or multivibrator as shown in FIG. 1, or it may be a commercially available pulser of suitable characteristics, or it may be a transistorized multivibrator designed for particular control of the circuitry. In the interest of brevity, pulser 112 is not described in detail since it has been covered in FIG. 1. The important circuitry in FIG. 2 is cut-off transistor 114 and its associated circuitry.

In a manner similar to the tube circuit, transistor 114 operates as a per-pulse cut-off device in the circuitry of FIG. 2. It must be noted in this instance, that when transistor 106 is rendered conductive, output transistor bank 78 is rendered nonconductive. The gap machining pulse in FIG. 2 occurs when transistor 78 is conductive and is interrupted during normal operation by the conduction of pulser 112 at selected time intervals through the base-emitter circuit of transistor 106.

Prior to the start of a machining pulse, pulser 112, transistors 106, 98 and 84 are all conductive, biasing power transistor bank 78 OFF. This is the desirable phasing since failure of transistors at least initially is in short circuit or partial conduction. Failure of any drive transistor thereby biases the output bank safely OFF thereby protecting the electrode and work as well as the expensive power circuitry.

In this condition transistor 114 is also biased OFF by the absence of any drive signal in its base circuit and by virtue of the direct resistance connection from the base of transistor 114 through potentiometer arm 116 and the lower leg of a potentiometer 118, through the lower portion of a potentiometer 120, reference arm 124, to the emitter of transistor 114. Since no voltage exists in this loop, cut-off transistor 114 is nonconductive.

At the initiation of a gap machining power pulse, pulser 112 becomes sharply nonconductive, rendering transistors 106, 98, and 84 nonconductive thereby permitting conduction of power transistor 78. If the space between electrode 12 and workpiece 14 is sufficient to permit voltage across the working gap, the remaining voltage of supply 80 is also presented across potentiometer 118 and a portion of this voltage is presented at tap 116. After a momentary delay interval, determined by the relative magnitude of capacitor 122 and the upper portion of potentiometer 118, this signal is applied to potentiometer arm 116. The per-pulse cut-off operation in this instance compares the relative magnitude between the portion of the gap current signal produced at 116 and the keying signal at 124. If the gap current as indicated across potentiometer 118 is below the voltage at keying tap 124, transistor 114 is maintained in a nonconducting condition and thus does not affect the operation of the power circuitry.

If the voltage at tap 124 is less than that of current reference at 116, transistor 114 becomes instantaneously conductive. The voltage at tap 124 is determined by the relative resistance of the lower portion of potentiometer 120 to the sum of the upper portion of potentiometer 120 and resistor 126 and is chosen in accordance with the relative gap current to be interrupted, or the difference between supply voltage and gap voltage to be interrupted, as indicated by the voltage across resistor 82.

Drive electron flow for operation of the cut-off transistor 114 occurs from the negative terminal of power voltage 80, through the lower portion of potentiometer 120, potentiometer arm 124, emitter-base of transistor 114, reference arm 116, the upper portion of potentiometer 118, electrode 12, workpiece 14, collector-emitter of transistor 78, and balancing resistor 128, to the positive terminal of power voltage 80, thus rendering transistor 114 conductive. This condition of conduction corresponds exactly to the performance of FIG. 1, in which a gap voltage lower than the preset magnitude occurring across the gap or gap current greater than the maximum desired will instantaneously render the cut-off device operative. In this instance, conduction of transistor 114 drives transistor 106 in such a manner as to interrupt conduction of transistor 78, thus instantaneously squelching the faulty pulse in the output.

In a manner similar to that of FIG. 1, transistor 114 may be so connected to directly affect the operation of the pulser by triggering the multivibrator portion of that pulser. In the circuitry shown in FIG. 2, however, cut-off transistor 114 overcomes the action of pulser 112 and operates independently of the pulser to shut off the faulty cutting power. Performance of the circuitry in this manner has the one advantage that after the very short delay time encountered in the transistor components and the various stages of the amplifier and capacitor 122, it is possible to reignite the gap immediately without waiting for the normal interval between pulses caused by pulser 112. Of course, no pulse of duration longer than that determined by pulser 112 is permitted, and the action of the cut-off transistor 114 is only to cut-off the faulty portion of any particular pulse. By proper connection of components this same effect, if desired, could be achieved in FIG. 1. It is only important to realize that each circuit performs instantaneously to interrupt a faulty condition of machining and does not rely on a delay of many pulses to turn either ON or OFF positively. This method of operation represents a substantial step forward in the art of EDM since now each individual gap pulse is electronically inspected and interrupted or shut off instantaneously if a flaw or undesirable condition of machining occurs, even during an individual pulse. Furthermore, increased efficiency result since only faulty pulses or faulty portions of an individual pulse are cut-off and succeeding pulses, which in many instances are entirely satisfactory, are permitted the opportunity of machining.

Figure 3:
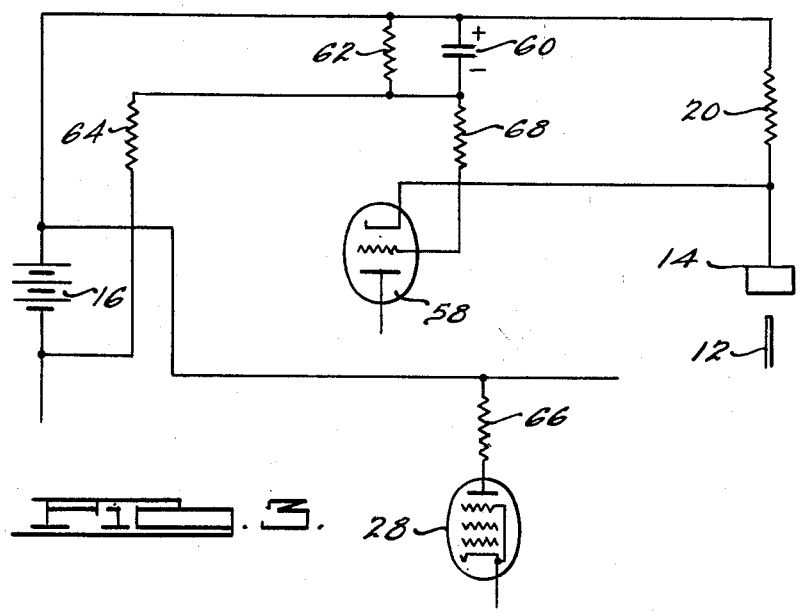
FIG. 3 is a modification of the FIG. 1 circuit.

An important difference between a current sensitive circuit and a gap voltage sensitive circuit, as described in the above mentioned U.S. Patent No. 3,018,411, resides in the fact that the keying pulse is not essential and may be replaced by a simple D.C. bias; FIG. 3 shows such a modification of the circuitry of FIG. 1. Resistors 64 and 62 are readjusted to provide an increased voltage across bias capacitor 60. In such a D.C. bias circuit, resistor 66 would then connect the anode of tube 28 to the positive terminal of plate supply 16, as shown, thus eliminating the complicated interconnection of the keying circuit and minimizing the possibility of undesired feed back and harmful effects of stray radiation. With the circuit thus connected, tube 58 would be maintained nonconductive except during during periods when the gap current was above the preset maximum as measured by resistor 20 and applied to the cathode of tube 58. In other words, as the voltage across resistor 20 approached the voltage across capacitor 60 the cathode would approach the grid potential, thereby causing conduction of tube 58 when the difference between these voltages was less than the cut-off bias requirement of tube 58.

Figure 4:
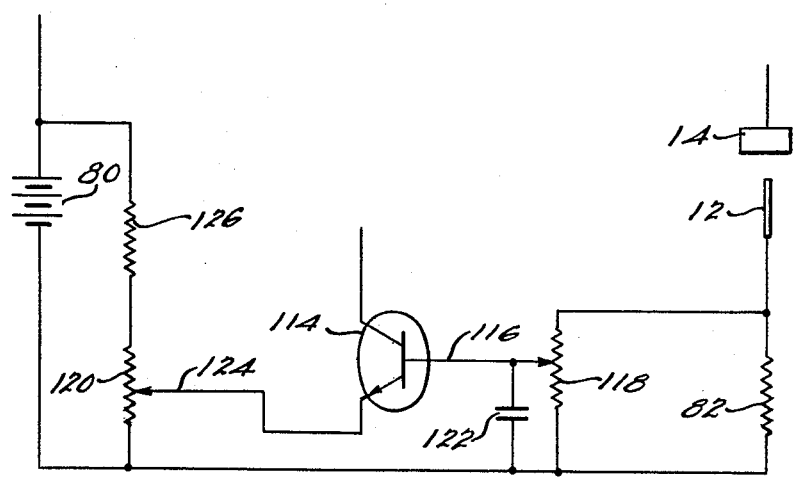
FIG. 4 is a modification of the FIG. 2 circuit.

Similarly, a modification of the FIG. 2 circuit is shown in FIG. 4 in which the emitter circuit of transistor 114 may be returned through potentiometer 120 and resistor 126 directly to the positive terminal of machining power supply 80 constituting a condition of D.C. bias. In a manner analogous to that of FIG. 1, increased voltage corresponding to increased current above the predetermined maximum across resistor 82 would render cut-off transistor 114 conductive.

The important consideration is that the direct bias method eliminates the complicated interconnection and minimizes the possibility of undesirable feed back or unintended stray radiation affecting the cut-off device particularly during transients resulting from switching. More important it is sometimes unnecessary to provide a delay capacitor as is shown in FIG. 2 as 122, since the external discharge loop inductance automatically retards machining current by the desired amount of any delay capacitor. Thus even this component and circuit connection may be eliminated producing far more reliable circuit connections and simplicity of operation.

In a vacuum circuit such as shown in FIG. 1, keying circuitry is totally unnecessary, since leakage currents approaching a magnitude sufficient to trigger the device during a period of cut-off would possibly destroy power tube 10 from excess wattage dissipation. This is particularly true if bias 60 exceeds that to just maintain tube 58 nonconductive. If bias 60 is set to the level just maintaining tube 58 nonconductive in the absence of other signal any leakage through resistor 20, corresponding to insufficient cut-off of tube 10, will trigger the cut-off circuitry and help assure interruption of the gap discharge. Such a condition of leakage in tube 10 is comparatively unlikely compared to the transistor circuitry of FIG. 2.

In the circuit of FIG. 2, there is no OFF bias on cut-off transistor 114 and this device relies upon the direct resistance connection between base and emitter during normal OFF periods to maintain the device nonconductive. Even minute leakage of power transistor 78 through resistor 82 during a condition of OFF-time is thus sufficient to render cut-off transistor 114 conductive.

The method of failure of all transistors is to become first partially conductive and then totally conductive even in the presence of an OFF bias. In other words, transistors always fail shorted or leaky, and even minute leakage of the transistor bank would be sufficient to maintain an undesirable continuous arc across the gap burning the electrode and workpiece. Connecting the keying resistor to the collector of transistor 78 as shown minimizes this condition and assures a continuous OFF bias of the machining power bank. Frequently this prolonged OFF bias will permit complete recovery of the bank and in any event eliminate damage of the electrode or workpiece.

In the above drawings, the D.C. supplies are shown as batteries in the interest of simplifying the disclosure. In actual practice, these sources of D.C. are derived from the secondary of a transformer having its primary connected to the power source for the machine which may be single phase or polyphase A.C. The secondary voltage is rectified and stored, usually in an electrolytic storage capacitor to form a nearly ideal D.C. source having very low internal impedance.

In the above examples, the electrode is shown as connected to the negative output of the machining power supply and the workpiece to the positive output. Present day knowledge indicates that in certain specialized and improved forms of machining, polarity may be reversed. It is essential that discrete pulses of the same polarity be applied in each case, and that polarity be selected in accordance with known principles. The above examples apply equally well to either polarity of machining.

This disclosure contains reference to transistors or vacuum tubes or other "electronic switches." It follows that with proper redesign of the circuit any "electronic switch" may be substituted. By "electronic switch" is meant any electronic control device having three or more terminals consisting of at least two terminals acting as a switch in the power circuit, the conductivity between said power terminals being controlled by a control element within the switch responsive to drive from an external control circuit whereby the conductivity of the power circuit is controlled statically or electrically without movement of mechanical elements within the switch.

It will thus be seen that I have shown and described four examples of a novel current sensitive per-pulse cut-off circuit much simpler than those previously described and of equal, if not superior, performance. These have been shown for illustrative purposes only and are not intended to restrict the scope of my invention which is capable of various embodiments in accordance with the principles herein set forth.

I claim:

1. In an apparatus for machining a conductive workpiece by means of intermittent electrical discharge across a gap between an electrode and the workpiece in the presence of dielectric coolant, a source of machining power, an electronic switch connected between said power source and said gap, a pulser operably associated with said switch for rendering said switch alternately conductive and nonconductive, a cut-off device operatively connected with said switch to render said switch nonconductive after initiation of but prior to normal completion of any pulse of gap current above a predetermined maximum.

2. In an apparatus for machining a conductive workpiece by means of intermittent electrical discharge across a gap between an electrode and the workpiece in the presence of a dielectric coolant, a source of machining power, an electronic power switch connected between said power source and said gap, a pulser operably connected to said switch for rendering it alternately conductive and nonconductive to furnish machining power pulses to said gap, means for establishing a voltage representative of the level of gap current, an electronic cut-off switch having its control electrode and one principal electrode operatively connected to the aforesaid means, said cut-off switch having its other principal electrode operatively connected to said power switch for rendering it nonconductive after initiation of but prior to normal completion of any pulse of current above a predetermined maximum.

3. The combination as set forth in claim 2 in which said electronic power switch comprises at least one vacuum tube having its principal electrodes connected in series between said source and said gap.

4. The combination as set forth in claim 3 in which said means comprises a noninductive resistance connected in series between said source and said gap and said cut-off switch comprises an electron tube having its cathode connected to one terminal of said resistance, its control grid operatively connected to the other terminal of said resistance, and its anode operatively connected to and controlling the operation of said pulser.

5. The combination as set forth in claim 2 in which said electronic power switch comprises at least one transistor connected in common emitter relationship with said pulser connected operably to the base-emitter junction of said transistor and the collector-emitter junction of said transistor operably connected between said source and said gap.

6. The combination as set forth in claim 5 in which said means comprises a noninductive resistance connected in series between said source and said gap, and said cut-off switch comprises a transistor having its base operatively connected to one terminal of said resistance, its emitter operatively connected to the other terminal of said resistance, and its collector operatively connected to and controlling the operation of said electronic power switch.

7. The combination as set forth in claim 2 in which said means comprises a noninductive resistance connected in series between said source and said gap.

8. The combination as set forth in claim 2 in which said pulser for said switch comprises an astable multivibrator including a pair of electron tubes, said tubes having their respective control grids and plates cross coupled for alternate operation, said electronic cut-off switch having its principal electrode connected to the control grid of one of said tubes for providing a cut-off signal thereto.

9. The combination as set forth in claim 2 in which a biasing means is operatively connected in the control circuit of said cut-off switch for maintaining it inoperative in the absence of gap current below said predetermined maximum.

10. The combination as set forth in claim 9 in which said biasing means comprises a parallel resistor-capacitor biasing network operatively connected between said source and the control electrode of said cut-off switch.

11. In an apparatus for machining a conductive workpiece by means of intermittent electrical discharge across a gap between an electrode and the workpiece in the presence of a dielectric coolant, a source of machining power, an electronic power switch connected between said power source and said gap, a pulser operably associated with said switch for rendering it alternately conductive and nonconductive, a noninductive resistance connected between said source and said gap for establishing a voltage representative of the level of gap current, an electronic cut-off switch having its control electrode and one principal electrode operatively connected across said resistance and operable responsive to gap current above a predetermined maximum to provide a control signal through its other principal electrode to interrupt operation of said power switch after initiation of but prior to normal completion of any pulse of current above said maximum, and means for enabling the operation of said cut-off switch in phase with the conduction of said power switch.

12. The combination as set forth in claim 11 in which said last mentioned means comprises a keying means connected between the output of said pulser and the control electrode of said electronic cut-off switch.

13. The combination as set forth in claim 12 in which said pulser comprises an astable multivibrator including a pair of electron tubes, said tubes having their respective control grids and plates cross coupled for alternate operation, said enabling means comprising an amplifier tube connected intermediate the output of one of said tubes and said power switch and a keying resistor connected between the output of said amplifier tube and the control grid of said electronic cut-off switch.

14. The combination as set forth in claim 11 in which said power switch comprises at least one vacuum tube having its plate and cathode connected in series between said source and said gap and said cut-off switch comprises an electron tube.

15. The combination as set forth in claim 11 in which said electronic power switch comprises at least one power transistor connected in common emitter relationship with said pulser operably connected to the base-emitter junction of said transistor and the collector-emitter junction of said transistor operably connected between said source and said gap.

16. The combination as set forth in claim 15 in which said enabling means comprises a keying resistor operatively connected between the collector of said power transistor and the control circuit of said cut-off transistor.

17. The combination as set forth in claim 1 in which a keying means is included for enabling the operation of said cut-off device in phase with the conduction of said switch.

18. The combination as set forth in claim 1 in which a biasing means is operatively connected between said source and said cut-off device for maintaining it inoperable in the absence of gap current above said predetermined maximum.

19. In an apparatus for machining a conductive workpiece by means of intermittent electrical discharge across a gap between an electrode and the workpiece in the presence of a dielectric coolant, a source of machining power, an electronic power switch operably connected to said source and periodically operated between conductive and nonconductive states for providing machining power pulses from said source across said gap, means for establishing a difference between the voltage output of said source and the voltage at said gap representative of the level of gap current, and a cut-off device operatively connected between the aforesaid means and the control electrode of said power switch, said cut-off device providing an output operable to interrupt said power switch after initiation of but prior to completion of any pulse of abnormal current characteristic.

20. The combination as set forth in claim 19 in which said means comprises a noninductive resistance serially connected between said source and said gap.

21. The combination as set forth in claim 20 in which said cut-off device comprises an electronic switch having its control electrode connected between said resistance and said gap and the output of one of its principal electrodes operatively connected to the control electrode of said power switch.

22. The combination as set forth in claim 21 in which a keying means is operatively connected to said cut-off device for rendering it operable in phase with said power switch.

23. The combination as set forth in claim 21 in which a biasing means is operatively connected to the control electrode of said cut-off switch for maintaining it inoperative in the absence of a gap current in excess of said predetermined level.

24. The combination as set forth in claim 23 in which said biasing means comprises a parallel resistor-capacitor network connected between a source of D.C. potential and said control electrode of said cut-off switch.

25. The combination as set forth in claim 22 in which said keying means comprises a keying resistor operatively connected between the output of said power switch and one electrode of said cut-off switch.

References Cited by the Examiner

UNITED STATES PATENTS 2,769,078   10/56   Matulaitis _____ 317—23 X
3,018,411   1/62    Webb _____ 315—163

RICHARD M. WOOD, *Primary Examiner.*

ARTHUR GAUSS, *Examiner.*